United States Patent
Long et al.

(10) Patent No.: US 10,444,842 B2
(45) Date of Patent: Oct. 15, 2019

(54) METHOD AND APPARATUS FOR MODULATING HAPTIC FEEDBACK

(71) Applicant: Ultrahaptics IP Ltd, Bristol (GB)

(72) Inventors: Benjamin John Oliver Long, Bristol (GB); Thomas Andrew Carter, Bristol (GB); Sriram Subramanian, Bristol (GB)

(73) Assignee: ULTRAHAPTICS IP LTD, Bristol (GB)

( * ) Notice: Subject to any disclaimer, the term of this patent is extended or adjusted under 35 U.S.C. 154(b) by 0 days.

(21) Appl. No.: 15/966,213

(22) Filed: Apr. 30, 2018

(65) Prior Publication Data

US 2018/0246576 A1     Aug. 30, 2018

Related U.S. Application Data

(66) Continuation of application No. 14/916,179, Substitute for application No. PCT/GB2015/052578, filed on Sep. 7, 2015, now Pat. No. 9,958,943.

(30) Foreign Application Priority Data

Sep. 9, 2014    (GB) .................................. 1415923.0

(51) Int. Cl.
    *G06F 3/01*       (2006.01)
    *G08B 6/00*       (2006.01)

(52) U.S. Cl.
    CPC .............. *G06F 3/016* (2013.01); *G08B 6/00* (2013.01); *G06F 3/011* (2013.01)

(58) Field of Classification Search
    CPC .................................. G06F 3/016; G08B 6/00

USPC ....................................................... 340/407.2
See application file for complete search history.

(56) References Cited

U.S. PATENT DOCUMENTS

| | | | |
|---|---|---|---|
| 4,218,921 A | 8/1980 | Oran et al. | |
| 4,771,205 A | 9/1988 | Mequio | |
| 4,881,212 A | 11/1989 | Takeuchi | |
| 5,329,682 A | 7/1994 | Thurn | |

(Continued)

FOREIGN PATENT DOCUMENTS

| | | |
|---|---|---|
| CN | 102591512 | 7/2012 |
| CN | 103797379 | 5/2014 |

(Continued)

OTHER PUBLICATIONS

Pompei, F.J. (2002), "Sound from Ultrasound: The Parametric Array as an Audible Sound Source", Massachusetts Institute of Technology.

(Continued)

*Primary Examiner* — Jack K Wang
(74) *Attorney, Agent, or Firm* — Koffsky Schwalb LLC; Mark I. Koffsky (57) ABSTRACT

The present invention concerns a method and apparatus for the modulation of an acoustic field for providing tactile sensations. A method of creating haptic feedback using ultrasound is provided. The method comprises the steps of generating a plurality of ultrasound waves with a common focal point using a phased array of ultrasound transducers, the common focal point being a haptic feedback point, and modulating the generation of the ultrasound waves using a waveform selected to produce little or no audible sound at the haptic feedback point.

20 Claims, 7 Drawing Sheets

(56) References Cited

U.S. PATENT DOCUMENTS

| | | | |
|---|---|---|---|
| 5,426,388 A | 6/1995 | Flora et al. | |
| 5,511,296 A | 4/1996 | Dias | |
| 6,503,204 B1 | 1/2003 | Sumanaweera et al. | |
| 6,647,359 B1* | 11/2003 | Verplank | G10H 3/12 381/119 |
| 6,772,490 B2 | 8/2004 | Toda | |
| 6,800,987 B2 | 10/2004 | Toda | |
| 7,109,789 B2 | 9/2006 | Spencer | |
| 7,225,404 B1 | 5/2007 | Zilles et al. | |
| 8,279,193 B1* | 10/2012 | Birnbaum | G06F 3/016 345/173 |
| 8,607,922 B1 | 12/2013 | Werner | |
| 8,884,927 B1 | 11/2014 | Cheatham, III | |
| 9,208,664 B1 | 12/2015 | Peters et al. | |
| 9,612,658 B2 | 4/2017 | Subramanian | |
| 9,841,819 B2 | 12/2017 | Carter | |
| 9,945,818 B2 | 4/2018 | Ganti | |
| 2002/0149570 A1 | 10/2002 | Knowles | |
| 2003/0024317 A1 | 2/2003 | Miller | |
| 2003/0144032 A1 | 7/2003 | Brunner et al. | |
| 2004/0014434 A1 | 1/2004 | Haardt | |
| 2004/0091119 A1 | 5/2004 | Duraiswami et al. | |
| 2004/0226378 A1 | 11/2004 | Oda | |
| 2004/0264707 A1 | 12/2004 | Yang | |
| 2005/0212760 A1* | 9/2005 | Marvit | G06F 1/1613 345/156 |
| 2006/0085049 A1 | 4/2006 | Cory et al. | |
| 2006/0091301 A1 | 5/2006 | Trisnadi | |
| 2007/0177681 A1 | 8/2007 | Choi et al. | |
| 2008/0012647 A1 | 1/2008 | Risbo et al. | |
| 2008/0273723 A1 | 11/2008 | Hartung et al. | |
| 2008/0300055 A1* | 12/2008 | Lutnick | G07F 17/3209 463/39 |
| 2009/0093724 A1 | 4/2009 | Pernot et al. | |
| 2010/0013613 A1 | 1/2010 | Weston | |
| 2010/0085168 A1 | 4/2010 | Kyung | |
| 2010/0103246 A1 | 4/2010 | Schwerdtner | |
| 2010/0109481 A1 | 5/2010 | Buccafusca | |
| 2010/0262008 A1 | 10/2010 | Roundhill | |
| 2011/0051554 A1 | 3/2011 | Varray et al. | |
| 2011/0199342 A1 | 8/2011 | Vartanian et al. | |
| 2011/0310028 A1 | 12/2011 | Camp, Jr. | |
| 2012/0063628 A1 | 3/2012 | Rizzello | |
| 2012/0223880 A1* | 9/2012 | Birnbaum | G06F 3/015 345/156 |
| 2012/0229401 A1 | 9/2012 | Birnbaum et al. | |
| 2012/0299853 A1 | 11/2012 | Dagar | |
| 2012/0307649 A1 | 12/2012 | Park et al. | |
| 2012/0315605 A1 | 12/2012 | Cho | |
| 2013/0035582 A1 | 2/2013 | Radulescu | |
| 2013/0100008 A1 | 4/2013 | Marti | |
| 2013/0101141 A1 | 4/2013 | McElveen | |
| 2014/0168091 A1 | 6/2014 | Jones | |
| 2014/0265572 A1 | 9/2014 | Siedenburg | |
| 2015/0006645 A1 | 1/2015 | Oh | |
| 2015/0007025 A1 | 1/2015 | Sassi | |
| 2015/0066445 A1 | 3/2015 | Lin et al. | |
| 2015/0070147 A1 | 3/2015 | Cruz-Hernandez et al. | |
| 2015/0070245 A1 | 3/2015 | Han et al. | |
| 2015/0110310 A1 | 4/2015 | Minnaar | |
| 2015/0013023 A1 | 5/2015 | Harris et al. | |
| 2015/0130323 A1 | 5/2015 | Harris | |
| 2015/0168205 A1 | 6/2015 | Lee | |
| 2015/0192995 A1 | 7/2015 | Subramanian et al. | |
| 2015/0220199 A1 | 8/2015 | Wang | |
| 2015/0226537 A1* | 8/2015 | Schorre | A61B 5/6841 356/479 |
| 2015/0226831 A1 | 8/2015 | Nakamura et al. | |
| 2015/0248787 A1 | 9/2015 | Abovitz | |
| 2015/0277610 A1 | 10/2015 | Kim | |
| 2015/0304789 A1 | 10/2015 | Babyoff | |
| 2016/0044417 A1 | 2/2016 | Clemen | |
| 2016/0124080 A1 | 5/2016 | Carter | |
| 2016/0189702 A1 | 6/2016 | Blanc et al. | |
| 2016/0242724 A1* | 8/2016 | Lavallee | A61B 6/032 |
| 2016/0246374 A1 | 8/2016 | Carter | |
| 2016/0249150 A1 | 8/2016 | Carter et al. | |
| 2016/0320843 A1 | 11/2016 | Long | |
| 2017/0004819 A1 | 1/2017 | Ochiai | |
| 2017/0018171 A1 | 1/2017 | Carter | |
| 2017/0123499 A1 | 5/2017 | Eid | |
| 2017/0193768 A1 | 7/2017 | Long | |
| 2017/0193823 A1 | 7/2017 | Jiang | |
| 2018/0361174 A1* | 12/2018 | Radulescu | A61N 7/02 |

FOREIGN PATENT DOCUMENTS

| | | |
|---|---|---|
| CN | 103984414 A | 8/2014 |
| EP | 1911530 | 4/2008 |
| GB | 2464117 | 4/2010 |
| GB | 2513884 | 11/2014 |
| GB | 2530036 | 3/2016 |
| JP | 2010109579 | 5/2010 |
| JP | 2011172074 | 9/2011 |
| JP | 201248378 | 3/2012 |
| JP | 2016035646 | 3/2016 |
| KR | 20120065779 | 6/2012 |
| KR | 20130055972 | 5/2013 |
| KR | 20160008280 | 1/2016 |
| WO | 1991/18486 | 11/1991 |
| WO | 96/39754 | 12/1996 |
| WO | 2005/017965 | 2/2005 |
| WO | 2013/179179 | 12/2013 |
| WO | 2014181084 | 11/2014 |
| WO | 2015/039622 | 3/2015 |
| WO | 2016007920 | 1/2016 |
| WO | 2016132141 A1 | 8/2016 |
| WO | 2016132144 | 8/2016 |
| WO | 2016/162058 | 10/2016 |

OTHER PUBLICATIONS

Hasegawa, K. and Shinoda, H. (2013) "Aerial Display of Vibrotactile Sensation with High Spatial-Temporal Resolution using Large Aperture Airbourne Ultrasound Phased Array", University of Tokyo.

Hoshi, T. et al. (2010), "Noncontrast Tactile Display Based on Radiation Pressure of Airbourne Ultrasound ", IEEE Transactions on Haptics, vol. 3, No. 3.

Yoshino, K. and Shinoda, H. (2013), "Visio Acoustic Screen for Contactless Touch Interface with Tactile Sensation", University of Tokyo.

Kamakura, T. and Aoki, K. (2006) "A Highly Directional Audio System using a Parametric Array in Air" WESPAC IX 2006.

Alexander, J. et al. (2011), "Adding Haptic Feedback to Mobile TV".

Carter, T. et al. (2013) "Ultrahaptics: Multi-point Mid-Air Haptic Feedback for Touch Surfaces" UIST.

Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.

Search Report for GB1308274.8 dated Nov. 11, 2013.

Search Report for PCT/GB2014/051319 dated Jul. 28, 2014.

Gavrilov L R Et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.

Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.

E.S. Ebbini et al. (1991), A spherical-section ultrasound phased array applicator for deep localized hyperthermia, Biomedical Engineering, IEEE Transactions on (vol. 38 Issue: 7), pp. 634-643.

Iwamoto et al. (2006), Two-dimensional Scanning Tactile Display using Ultrasonic Radiation Pressure, Symposium of Haptic Interfaces for Virtual Environment and Teleoperator Systems, pp. 57-61.

Iwamoto et al. (2008), Non-contact Method for Producing Tactile Sensation Using Airborne Ultrasound, EuroHaptics, pp. 504-513.

Search report for PCT/GB2015/052578 dated Oct. 26, 2015.

(56) References Cited

OTHER PUBLICATIONS

IPRP for PCT/GB2014/051319 dated Nov. 10, 2015.
Search Report for GB1415923.0 dated Mar. 11, 2015.
Marshall, M., Carter, T., Alexander, J., & Subramanian, S. (2012). Ultratangibles: creating movable tangible objects on interactive tables. In Proceedings of the 2012 ACM annual conference on Human Factors in Computing Systems. (pp. 2185-2188).
Obrist et al., Talking about Tactile Experiences, CHI 2013, Apr. 27-May 2, 2013.
Long et al. Rendering Volumetric Haptic Shapes in Mid-Air using Ultrasound, ACM Transactions on Graphics (Proceedings of SIGGRAPH Asia), vol. 33, No. 6, Article 181 (Nov. 2014).
Freeman et al., Tactile Feedback for Above-Device Gesture Interfaces: Adding Touch to Touchless Interactions ICMI'14, Nov. 12-16, 2014, Istanbul, Turkey.
Obrist et al., Emotions Mediated Through Mid-Air Haptics, CHI 2015, Apr. 18-23, 2015, Seoul, Republic of Korea.
Wilson et al., Perception of Ultrasonic Haptic Feedback on the Hand: Localisation and Apparent Motion, CHI 2014, Apr. 26-May 1, 2014, Toronto, Ontario, Canada.
Phys.org, Touchable Hologram Becomes Reality, Aug. 6, 2009, by Lisa Zyga.
Iwamoto et al., Airborne Ultrasound Tactile Display: Supplement, The University of Tokyo 2008.
Hoshi, T., Development of Aerial-Input and Aerial-Tactile-Feedback System, IEEE World Haptics Conference 2011, p. 569-573.
EPSRC Grant summary EP/J004448/1 (2011).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Eurohaptics Conference and Symposium on Haptic Interfaces for Virtual Environment and Teleoperator Systems 2009.
Tom Nelligan and Dan Kass, Intro to Ultrasonic Phased Array (date unknown).
Light, E.D., Progress in Two Dimensional Arrays for Real Time Volumetric Imaging, 1998.
Casper et al., Realtime Control of Multiple-focus Phased Array Heating Patterns Based on Noninvasive Ultrasound Thermography, IEEE Trans Biomed Eng. Jan. 2012 ; 59(1): 95-105.
Hoshi, T., Touchable Holography, SIGGRAPH 2009, New Orleans, Louisiana, Aug. 3-7, 2009.
Sylvia Gebhardt, Ultrasonic Transducer Arrays for Particle Manipulation (date unknown).
Marshall et al., Ultra-Tangibles: Creating Movable Tangible Objects on Interactive Tables, CHI'12, May 5-10, 2012, Austin, Texas.
Marzo et al., Holographic acoustic elements for manipulation of levitated objects, Nature Communications DOI: 10.1038/ncomms9661 (2015).
Search report and Written Opinion of ISA for PCT/GB2015/050417 dated Jul. 8, 2016.
Search report and Written Opinion of ISA for PCT/GB2015/050421 dated Jul. 8, 2016.
Martinez-Graullera et al., 2D array design based on Fermat spiral for ultrasonic imaging, Ultrasonics 50 (2010) 280-89.
Search report and Written Opinion of ISA for PCT/GB2017/050012 dated Jun. 8, 2017.
Search Report for PCT/GB2017/052332 dated Oct. 10, 2017.
Xin Cheng et al., Computation of the Aoustic Radiation Force on a Sphere Based on the 3-D FDTD Method, IEEE Symposium 2010.
K. Jia, Dynamic properties of micro-particles in ultrasonic transportation using phase-controlled standing waves, J. Applied Physics 116, n. 16 (2014).
Yang Ling, Phase-coded approach for controllable generation of acoustical vortices, J. Applied Physics 113, No. 15 (2013).

M. Barmatz, Acoustic radiation potential on a sphere in plane, cylindrical, and spherical standing wave of fields, J. Acoustical Socirty, 77 No. 3 (1985).
M. A.B. Andrade, Matrix method for acoustic levitation simulation, IEEE Transactions on Ultrasonics Ferroelectrics and Frequency Control, 58 n. 8 (2011).
Search Report for PCT/GB/2017/053729 dated Mar. 15, 2018.
Search Report for PCT/GB/2017/053880 dated Mar. 21, 2018.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Search report for PCT/US2018/028966 dated Jul. 13, 2018 (43 pages).
Search report for PCT/GB2018/051061 dated Sep. 26, 2018 (17 pages).
EPO Office Action for EP16708440.9 dated Sep. 12, 2018 (7 pages).
E. Bok, Metasurface for Water-to-Air Sound Transmission, Physical Review Letters 120, 044302 (2018).
M. Toda, New Type of Matching Layer for Air-Coupled Ultrasonic Transducers, IEEE Transactions on Ultrasonics, Ferroelectrics, and Frequency Control, vol. 49, No. 7, Jul. 2002.
A. Sand, Head-Mounted Display with Mid-Air Tactile Feedback, Proceedings of the 21st ACM Symposium on Virtual Reality Software and Technology, Nov. 13-15, 2015.
"Welcome to Project Soli" video, https://atap.google.com/#project-soli Accessed Nov. 30, 2018, 2 pages.
Colgan, A., "How Does the Leap Motion Controller Work?" Leap Motion, Aug. 9, 2014, 10 pages.
Damn Geeky, "Virtual projection keyboard technology with haptic feedback on palm of your hand," May 30, 2013, 4 pages.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration"according to VVikipedia, 2 pages., Retrieved Nov. 2018.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Iddan, et al., "3D Imaging in the Studio (and Elsewhwere . . . " Apr. 2001, 3DV systems Ltd., Yokneam, Isreal, www.3dvsystems.com.il, 9 pages.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
Japanese Office Action (with English language translation) for Application No. 2017-514569, dated Mar. 31, 3019, 10 pages.
Kolb, et al., "Time-of-Flight Cameras in Computer Graphics," Computer Graphics forum, vol. 29 (2010), No. 1, pp. 141-159.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCCD—Technology", A dissertation submitted to Department of EE and CS at Univ. of Siegen, dated Jun. 28, 2000, 223 pages.
Li, Larry, "Time-of-Flight Camera—An Introduction," Texas Instruments, Technical White Paper, SLOA190B—Jan. 2014 Revised May 2014, 10 pages.
Meijster, A., et al., "A General Algorithm for Computing Distance Transforms in Linear Time," Mathematical Morphology and its Applications to Image and Signal Processing, 2002, pp. 331-340.
Notice of Allowance dated Dec. 19, 2018 for U.S. Appl. No. 15/665,629 (pp. 1-9).

(56) References Cited

OTHER PUBLICATIONS

Notice of Allowance dated Dec. 21, 2018 for U.S. Appl. No. 15/983,864 (pp. 1-7).
Notice of Allowance dated Feb. 7, 2019 for U.S. Appl. No. 15/851,214 (pp. 1-7).
Office Action dated Apr. 18, 2019 for U.S. Appl. No. 16/296,127 (pp. 1-6).
Office Action dated Apr. 4, 2019 for U.S. Appl. No. 15/897,804 (pp. 1-10).
Office Action dated Feb. 20, 2019 for U.S. Appl. No. 15/623,516 (pp. 1-8).
Office Action dated May 16, 2019 for U.S. Appl. No. 15/396,851 (pp. 1-7).
PCT Partial International Search Report for Application No. PCT/GB2018/053404 dated Feb. 25, 2019, 13 pages.
Schmidt, Ralph, "Multiple Emitter Location and Signal Parameter Estimation" IEEE Transactions of Antenna and Propagation, vol. AP-34, No. 3, Mar. 1986, pp. 276-280.
Sixth Sense webpage, http://www.pranavmistry.com/projects/sixthsense/ Accessed Nov. 30, 2018, 7 pages.
Steve Guest et al., "Audiotactile interactions in roughness perception", Exp. Brain Res (2002) 146:161-171, DOI 10.1007/s00221-002-1164-z, Received: Feb. 9, 2002/Accepted: May 16, 2002/Published online: Jul. 26, 2002, Springer-Verlag 2002, (11 pages).
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Teixeira, et al., "A brief introduction to Microsoft's Kinect Sensor," Kinect, 26 pages, retrieved Nov. 2018.
Zeng, Wejun, "Microsoft Kinect Sensor and Its Effect," IEEE Multimedia, Apr.-Jun. 2012, 7 pages.
Corrected Notice of Allowability dated Jun. 21, 2019 for U.S. Appl. No. 15/966,213 (2 pages).
Office Action dated Jul. 10, 2019 for U.S. Appl. No. 15/210,661 (pp. 1-12).
Notice of Allowance dated Jul. 31, 2019 for U.S. Appl. No. 15/851,214 (pp. 1-9).
Office Action dated Jul. 26, 2019 for U.S. Appl. No. 16/159,695 (pp. 1-8).
International Search Report and Written Opinion for Application No. PCT/GB2018/053739, dated Jun. 4, 2019, 16 pages.

* cited by examiner

METHOD AND APPARATUS FOR MODULATING HAPTIC FEEDBACK

REFERENCE TO RELATED APPLICATIONS

The present application is a continuation of U.S. patent application Ser. No. 14/916,179, filed Mar. 2, 2016, which is a U.S. national phase of PCT Application No. PCT/GB2015/052578 filed Sep. 7, 2015, which claims benefit of United Kingdom Application No. 1415923.0, filed Sep. 9, 2014. All of the above-referenced applications are incorporated herein by reference.

FIELD OF THE INVENTION

The present invention concerns a method and apparatus for the modulation of an acoustic field for providing tactile sensations. More particularly, but not exclusively, this invention concerns a method and apparatus for the modulation of an acoustic field for providing tactile sensations in order to provide an improved user experience.

BACKGROUND

Various interactive haptic technologies exist, which provide a user or users with tactile information or feedback, often in combination with visual information displayed on an interactive screen. For example, previous haptic feedback devices include pins moving to physically change a deformable surface. A pen connected to an articulated arm may be provided, as in the SensAble PHANTOM device. Alternatively, a user may wear, for example in the form of a glove, one or more actuators which are activated to provide haptic feedback to a user. However, in each of these technologies, a user requires physical contact with a deformable surface, a pen, or a specially adapted glove. Such requirements reduce the usability and spontaneity with which a user may interact with a system.

Tactile sensations on human skin can be created by using a phased array of ultrasound transducers to exert an acoustic radiation force on a target in mid-air. Ultrasound waves are transmitted by the transducers, with the phase emitted by each transducer adjusted such that the waves arrive concurrently at the target point in order to maximise the acoustic radiation force exerted.

Ultrasound haptic feedback systems create a vibrotactile sensation upon the skin of a user of the system. The focussed ultrasound creates enough force at the point of intersection to slightly displace the skin of a user. Typically, ultrasound haptic feedback systems use ultrasound with a frequency at or above 40 kHz, which is above the threshold for receptors in the skin to feel. Therefore, a user can only detect the onset and cessation of such focussed ultrasound. In order to provide a sensation that is detectable by the receptors in skin, the focussed ultrasound is modulated at a lower frequency, within the detectable range of the receptors. This range is typically from 1 Hz to 500 Hz.

A side effect of the modulation is that the ultrasound breaks down and creates a sound at the modulation frequency. Therefore, when creating tactile feedback with a 200 Hz modulation frequency, a 200 Hz sound is also produced. This audible sound may be annoying to users and is a barrier to ultrasound haptic technology being adopted.

The present invention seeks to mitigate the above-mentioned problems. Alternatively or additionally, the present invention seeks to provide an improved haptic feedback system.

SUMMARY OF THE INVENTION

The present invention provides, according to a first aspect, a method of creating haptic feedback using ultrasound comprising the steps of:
generating a plurality of ultrasound waves with a common focal point using a phased array of ultrasound transducers, the common focal point being a haptic feedback point,
modulating the generation of the ultrasound waves using a waveform selected to produce little or no audible sound at the haptic feedback point.

The method may comprise the step of generating a plurality of common focal points, each common focal point being a haptic feedback point.

The production of little or no audible sound at a haptic feedback point is dependent on both the loudness of any sound produced, together with the frequency at which any sound is produced. A small amount of audible sound may be produced, and considered acceptable. The acceptability of the sound produced by the creation of haptic feedback may be dependent on the background noise audible at the haptic feedback point. In a noisy environment, the acceptable level of sound produced at the haptic feedback point may be greater than the acceptable level of sound produced in a quiet environment. Therefore, the intended use of the haptic feedback system creating the haptic feedback and the environment in which the system is located will determine the acceptable level of sound production.

At high intensities, ultrasound becomes non-linear. This non-linear behaviour allows the creation of haptic feedback but also causes the audible sound produced in haptic feedback systems. An example of the effect of the non-linearity of ultrasound waves is utilising the effect to create highly directive audible sound with parametric speakers. The sound is produced due to the second derivative of the p term of the Westervelt equation.

$$\nabla^2 p + \frac{\delta}{c_0^4} \frac{\partial^3 p}{\partial t^3} + \frac{\beta}{\rho_0 c_0^4} \frac{\partial^2 p^2}{\partial t^2} - \frac{1}{c_0^2} \frac{\partial^2 p}{\partial t^2} = 0 \qquad \text{(Eq. 1)}$$

Where p is the sound pressure, which in the case of the invention is the difference between the instantaneous sound pressure at a point and the ambient sound pressure.

In the case of existing haptic feedback systems, a modulated phased array produces ultrasound modulated with a simple square wave pattern, i.e. the array is switched on and off at the modulation frequency. Therefore, the $p^2$ term is generating an approximate square wave at the focal point of the phased array with a frequency that matches the modulation frequency. The square wave generated by the non-linear breakdown of the ultrasound will create a relatively loud noise and is off putting to a user of such a haptic feedback system.

In order to reduce or eliminate the audible noise, the applicant has realised it is necessary to avoid sharp changes in sound pressure level throughout the acoustic field. These sharp changes in pressure, as demonstrated by the square wave example above, are turned into oscillations by the non-linear medium. By smoothing out the changes in sound pressure level, the sound produced may be reduced to a lower and/or inaudible level. The sound pressure may be continuously changed. The sound pressure may be continuously changed with the first derivative of the rate of change also being continuous. The sound pressure may be continuously changed with the second derivative of the rate of change being continuous. The maximum rate of change of sound pressure may be dependent on a number of factors, including the variability of threshold hearing of humans with frequency of sound waves, and factors such as the temperature and humidity of air in which the wave is being produced. The generation of haptic feedback may be "tuned" in order that any sound produced is suitably low for the intended use of the haptic feedback system.

Alternatively or additionally, the sound produced by the method may last only a very short time. As humans do not perceive sounds that last only very briefly, this can effectively make the sound produced inaudible.

One possible way of reducing the sound produced may be to avoid turning the transducers off, and therefore avoid the emission of acoustic energy rapidly switching between 0% and 100% as in a square wave modulation. The method may comprise the step of varying the position of the common focal point. The position of the common focal point may be constantly varied. The position of the common focal point may oscillate about a central focal point. For example, the phase delays of a phased array could be altered to defocus and refocus ultrasound to a feedback point at the modulation frequency. The sound pressure level emitted by an individual transducer in a phased array is small compared to the sound pressure level at the focal point, and so there will still be a large change in sound pressure at the focal point. Therefore, this solution may have a relatively small effect.

The method may comprise the step of avoiding sharp pressure changes at the focal point. The modulation may comprise selecting a waveform that is an interpolation of the transducer phases and amplitudes. The detailed description shows various interpolated waveforms and the waveforms that are produced at the focal point by the non-linear breakdown of the ultrasound. The waveforms may be interpolated between a fully on and fully off state. The interpolation curves may be generalised between any two transducer phase and amplitude configurations. The interpolation may be a linear interpolation. The interpolation may be a polynomial or trigonometric interpolation, such as a cosine interpolation. The interpolation may be a parametric speaker interpolation, arranged to result in a sinusoidal waveform being generated at the focal point. The parametric speaker interpolation may, for example, be according to the same equation as that used to encode a sinusoid into a parametric speaker beam to remove distortion. An example of such an equation can be found in Pompei (2002) "Sound from Ultrasound: The Parametric Array as an Audible Sound Source", Ph.D. MIT:US, Eq 3.9. The interpolated waveform may produce smoother waveforms at the focal point than the square wave modulation of the prior art.

The invention provides, according to a second aspect, a haptic feedback system comprising:

a phased array comprising a plurality of transducers arranged to emit ultrasound to create a haptic feedback point, the phased array arranged to emit ultrasound according to a modulation waveform having a shape that produces little or no sound when the ultrasound converges at the haptic feedback point.

The haptic feedback system may comprise a control unit. The haptic feedback system may comprise a driving unit. The driving unit may be arranged to drive the transducer to produce ultrasound. The control unit may be arranged to send control signals to the driving unit. The control unit may include a memory. The control unit may be arranged to modulate the output of the transducer according to a particular modulation waveform. The modulation waveform may be linear. The modulation waveform may be a polynomial or trigonometric interpolation, for example, a cosine interpolation. The modulation waveform may correspond to a parabolic speaker interpolation. The control unit may be a PC or other suitable computer device.

According to a third aspect, the invention provides a computer program product, the computer program comprising a series of instructions, the series of instructions such that when run on a control unit associated with a haptic feedback system according to the second aspect of the invention, the haptic feedback system operates such that the method steps according to the first aspect of the invention are carried out.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

In an example embodiment of the method, firstly the 3D position of a focal point is decided. A phased array is arranged to create an acoustic field, with the phases and amplitudes of each transducer calculated to achieve a high pressure at the focal point and a low pressure in surrounding areas. Two states then exist, firstly the focal point state, with the computed phases and amplitudes, and secondly the off state, with all of the transducers of a phased array set at zero amplitude. A frequency at which to modulate the feedback is then chosen in dependence on the desired feel of the feedback. Then a modulation waveform is chosen at the desired frequency, the modulation frequency chosen to minimise or reduce the audible sound produced at the focal point. An example modulation waveform is a cosine waveform. The modulation waveform is then applied to the operation of the transducers to interpolate between the two states identified above.

A more specific example, as applied to a particular haptic feedback system, is now described with reference to FIG. 1.

Figure 1:
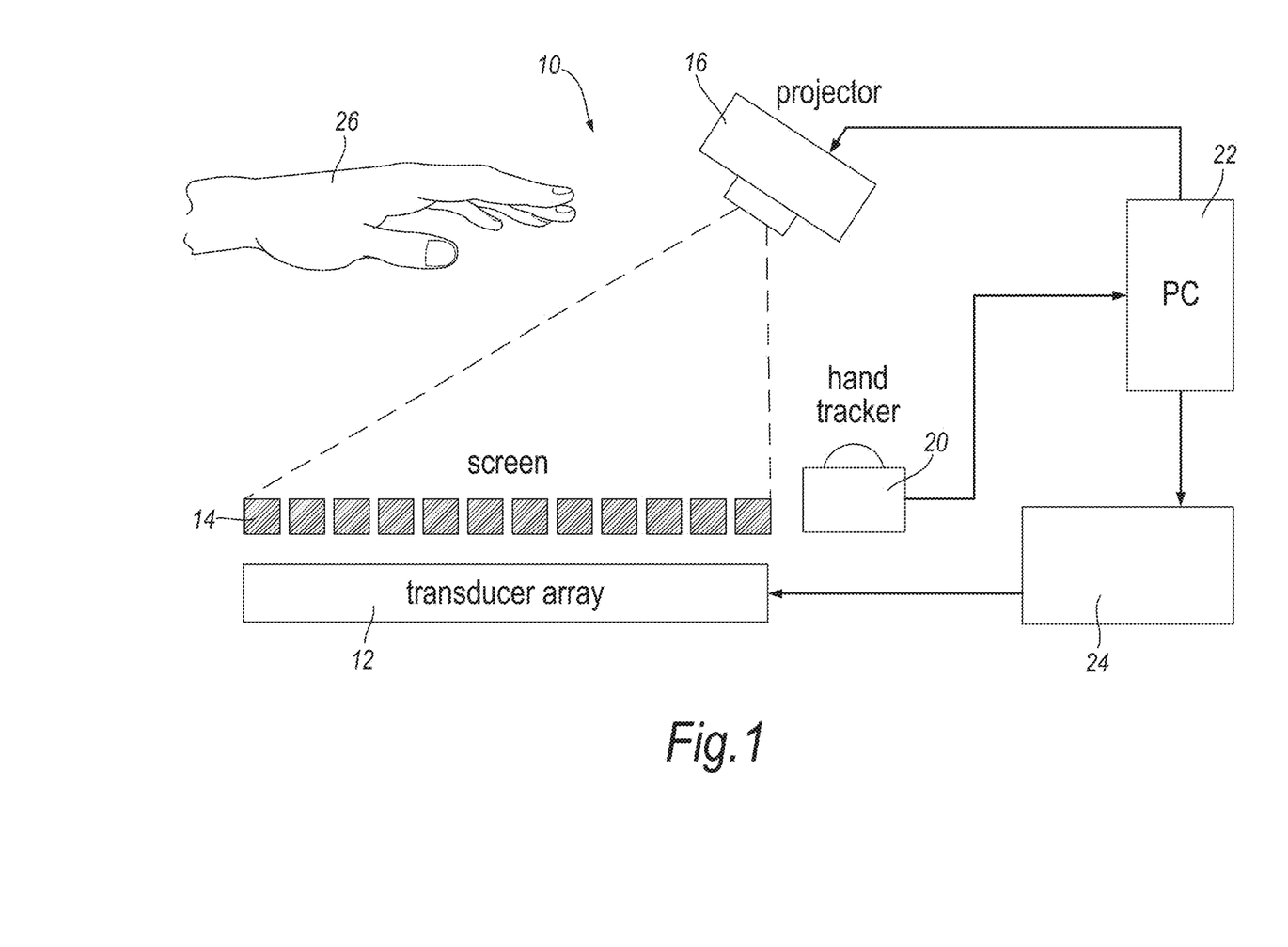
FIG. 1 shows a schematic view of a haptic feedback system according to a first embodiment of the invention.

FIG. 1 shows an example haptic feedback system 10 comprising a transducer array 12, a screen 14, a projector 16, a hand tracker 20, a PC 22, a driving unit 24, and a user's hand 26. The system 10 is shown to illustrate the invention, which is in no way limited to a particular system for producing haptic feedback using ultrasound. The transducer array 12 is located underneath the screen 14 and arranged such that pressure patterns may be transmitted through the screen 14 to a region above the screen 14. In this particular embodiment, the transducer array comprises 320 muRata MA40S4S transducers arranged in a 16×20 grid formation. Each transducer unit is 10 mm in diameter and the transducers are positioned with no gap between them in order to minimise the transducer array 12 footprint. The transducers produce a large amount of sound pressure (20 Pascals of pressure at a distance of 30 cm) and have a wide angle of directivity (60 degrees). The transducers are arranged to transmit ultrasound waves at a frequency of 40 kHz. The projector 16 is arranged to project visual information onto the screen 14 from above the screen 14 as shown. In an alternative embodiment, the projector may be placed between the transducer array and the screen, with the projection coming from below the screen.

A user interacts with this visual information and the movement and position of the user's hand 26 is tracked by the hand tracker 20. In this particular embodiment, the hand tracker 20 is a Leap Motion controller arranged to provide the 3D coordinates of the user's fingertips and palm at up to 200 frames per second. The system 10 is controlled by a PC 22, which sends control data to the projector 16, receives user data from the hand tracker 20, and controls the drive unit 24 for driving the transducer array 12. The PC 22 controls the driving unit 24 such that a pressure pattern is created in the region above the transducer array 12. In response to the hand movements of a user, the PC 22 may drive the driving unit 24 to cause the transducer array 12 to change the pressure pattern formed above the transducer array 12.

In order to compute the amplitude and phase of the acoustic wave each acoustic transducer must transmit for the desired pressure pattern to be created, an algorithm adapted from that proposed by Gavrilov ("The possibility of generating focal regions of complex configurations in application to the problems of stimulation of human receptor structures by focused ultrasound", L. R. Gavrilov, 2008, Acoustical Physics Volume 54, Issue 2, pp 269-278, Print ISSN 1063-7710) may be used. A volumetric box is defined above the transducer array 12. Within the box, a plurality of control points are defined. The control points may represent points where a maximum pressure value is desired, or points where minimum pressure values are desired. The pressure values are maximised or minimised by maximising or minimising the intensity of the ultrasound emitted by the transducer array 12 which is incident at the control points.

An algorithm is used to model the outputs of each of the transducers in the transducer array 12 required to obtain each of the desired pressure patterns which may be created within the volume defined above the transducer array 12. The algorithm may be split into three steps.

Firstly, the acoustic field generated by a single transducer is calculated to create a large modelled volume. Thereby, the phase and amplitude at any point within the modelled volume may be determined by offsetting the sample transducer for the position, phase, and amplitude, of each of the transducers in the real transducer array, and combining these values.

Secondly, the control points are defined in the 3D volume above the transducer array such that the control points take on the required distribution. The control points may be points of maximum intensity or minimum intensity (also known as null points). In addition to a 3D location, the desired modulation frequency of the maximum control points may be specified. Thirdly, the optimal phases are calculated using a minimum norm solver so that the resulting acoustic field is as close as possible to that specified by the control points. There may be more than one solution that will create an optimal focussing to the control points, but some solutions create a higher intensity than others. Solutions are therefore iteratively generated to find the one that creates the highest intensity.

The method according to an aspect of the invention comprises obtaining a modulation frequency that produces the required tactile sensation. For example, a relatively slow modulation frequency of 16 Hz would provide a slow, pulsing, sensation. A higher modulation frequency of 200 Hz would produce a near-continuous feeling. A modulation waveform is then selected at that frequency, which produces little or no audible sound at the feedback point. The modulation waveform may comprise an interpolation based on the required phase and amplitude of the waveform calculated as described above.

FIGS. 2 to 6 show a graph on the left hand side which represents the modulation waveform applied to the ultrasound emitted by an ultrasound transducer. The graph on the right hand side of the figures represents the audible waveform created at the focal point of the ultrasound transducer. Generally, the greater the amplitude and the more jagged the feedback waves created at the focal point, the louder the sound being produced will be.

Figure 2:
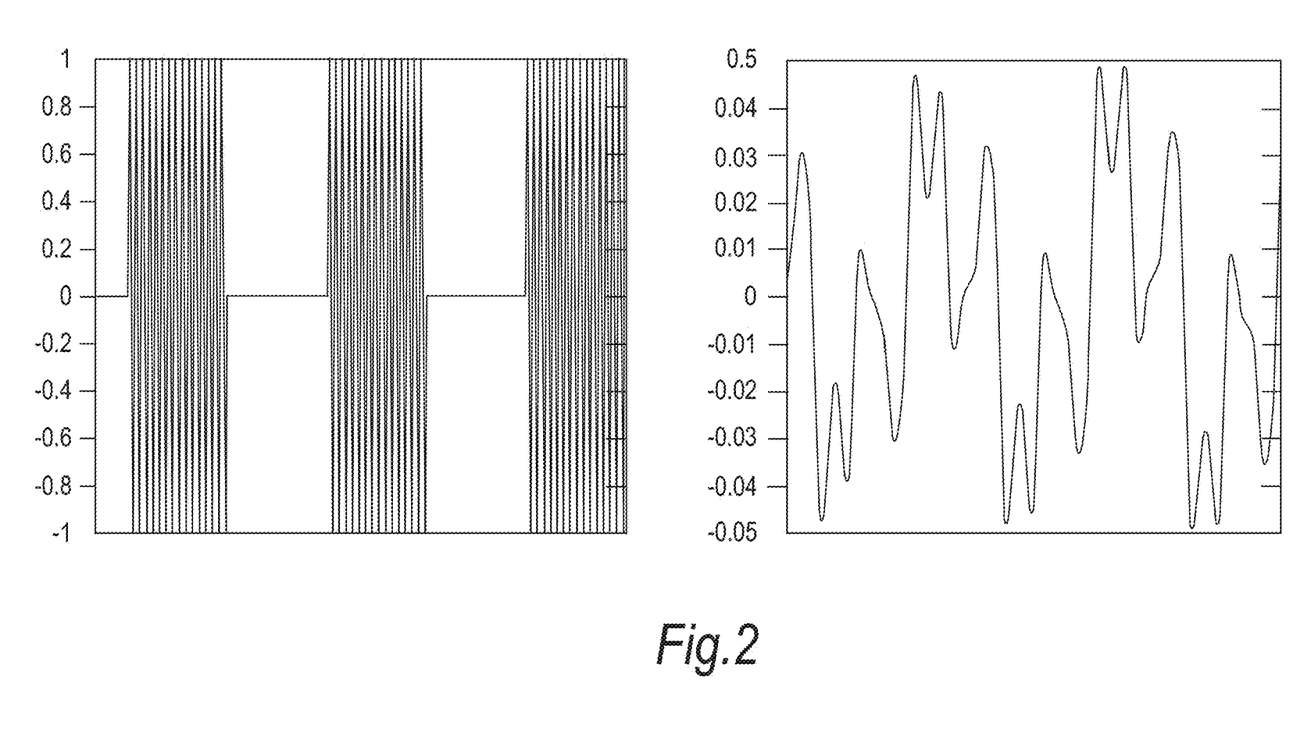
FIG. 2 shows a prior art square wave modulation pattern and the resultant waveform produced at the focal point.

In prior art systems, the modulation of the ultrasound corresponds to a simple square wave pattern, as shown in the graph on the left hand side of FIG. 2, where the array of transducers is simply turned on and off at the modulation frequency. The graph on the right hand side of FIG. 2 shows the waveform produced at the focal point of the ultrasound transducer when using a square wave modulation pattern. As is clear, the waveform is far from smooth and also the amplitude of the waveform is relatively high. This will result in a potentially loud and irritating sound being produced at the focal point of the haptic feedback system.

Figure 3:
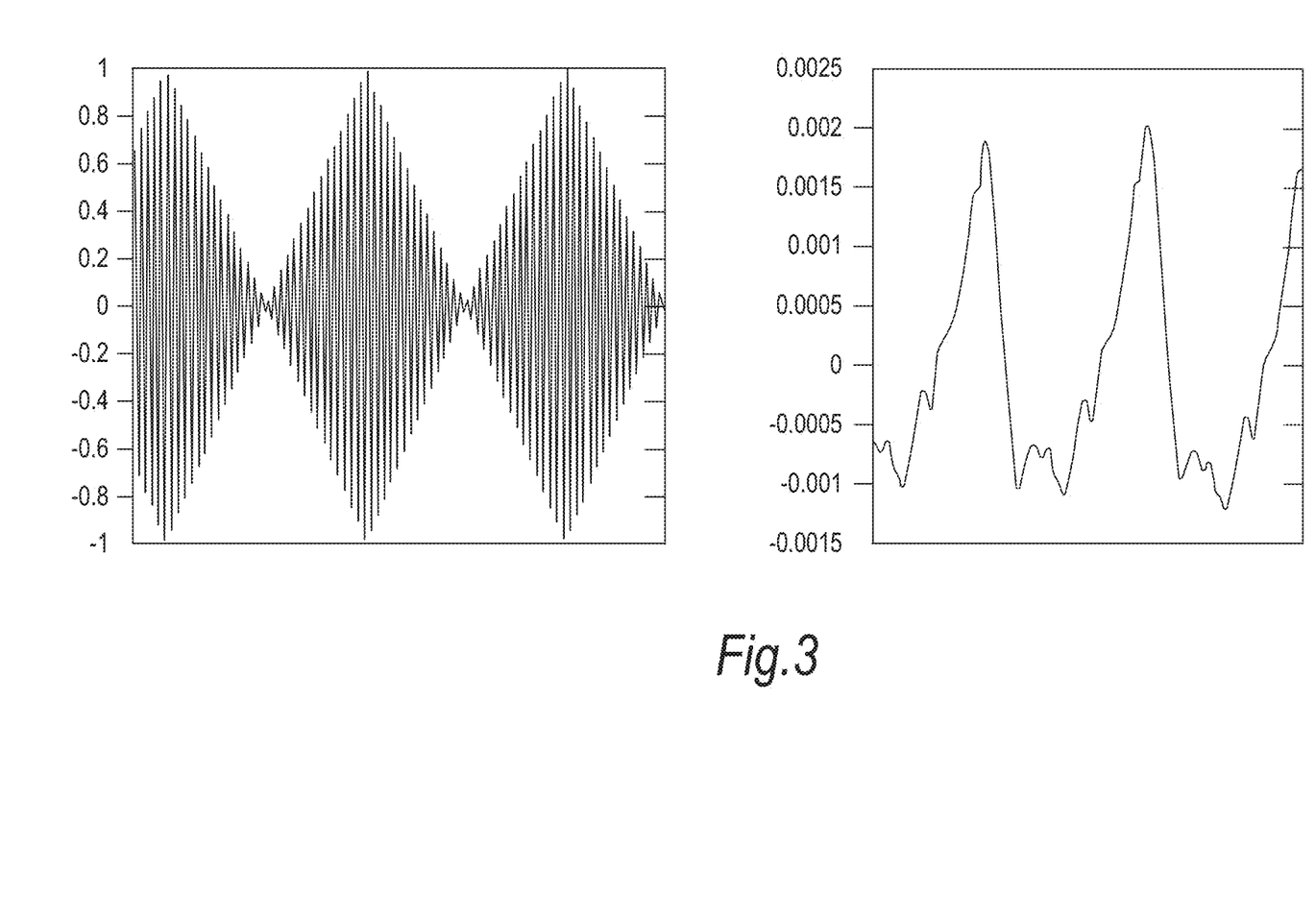
FIG. 3 shows a linear interpolation modulation pattern and the resultant waveform produced at the focal point according to a second aspect of the invention.

FIG. 3 shows an alternative modulation waveform, where the ultrasound is varied according to a linear interpolation. As can be seen in the graph on the right hand side of FIG. 3, the waveform produced at the focal point is smoother than that shown in FIG. 2, with an amplitude which is significantly smaller. Therefore, the sound produced at the focal point will be reduced compared to a square wave modulation.

Figure 4:
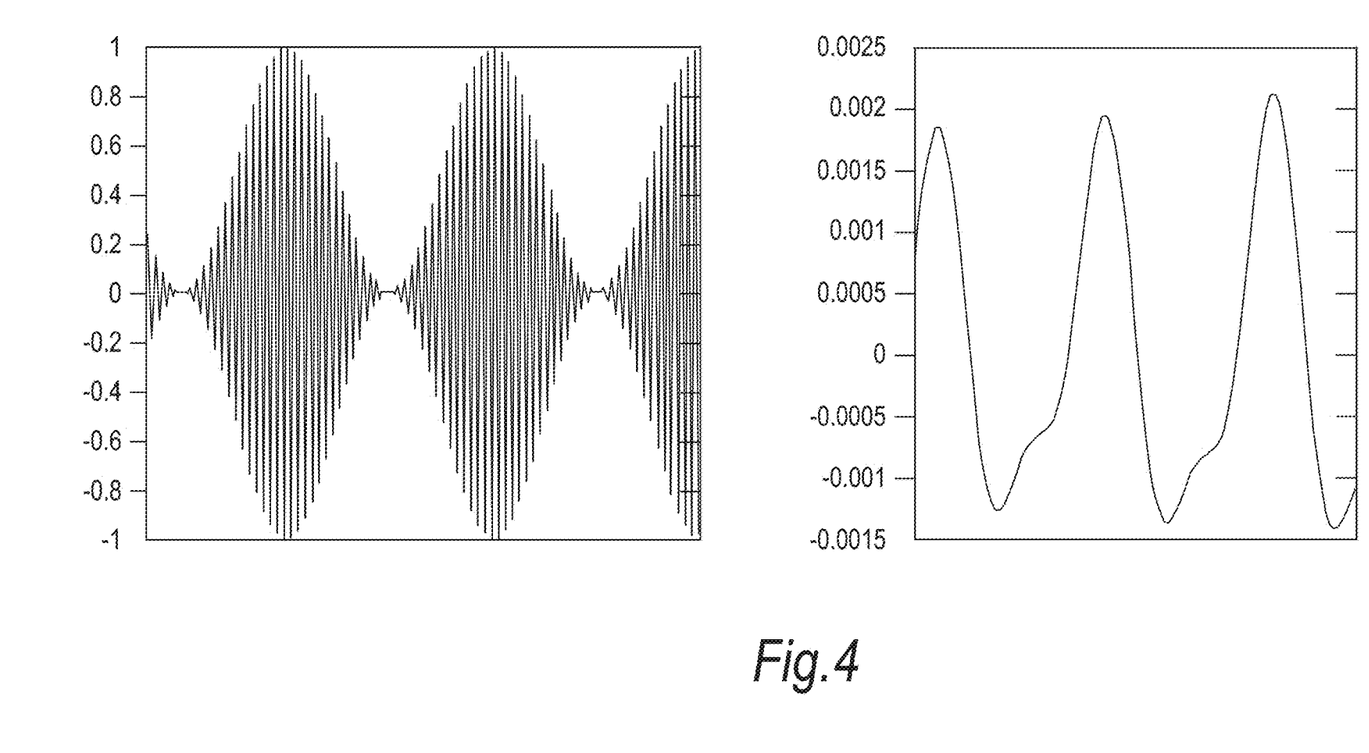
FIG. 4 shows a cosine interpolation modulation pattern and the resultant waveform produced at the focal point according to a third aspect of the invention.

FIG. 4 shows an alternative modulation waveform, where the ultrasound is varied according to a cosine interpolation. As can be seen in the graph on the right hand side of FIG. 4, the waveform produced at the focal point is smoother than that shown in FIG. 2, with an amplitude which is significantly smaller. Therefore, the sound produced at the focal point will be reduced compared to a square wave modulation.

Figure 5:
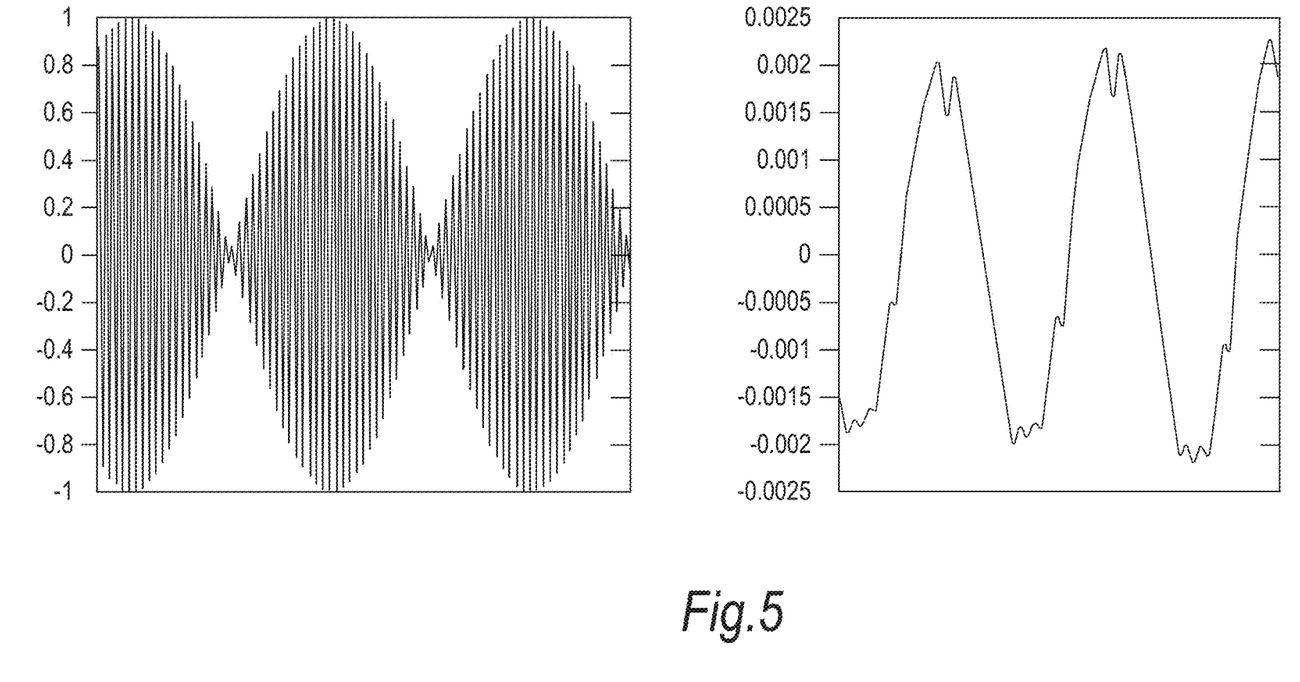
FIG. 5 shows a parametric speaker interpolation modulation pattern and the resultant waveform produced at the focal point according to a fourth aspect of the invention.

FIG. 5 shows an alternative modulation waveform, where the ultrasound is varied according to a parametric speaker interpolation. As can be seen in the graph on the right hand side of FIG. 5, the waveform produced at the focal point is smoother than that shown in FIG. 2, with an amplitude which is significantly smaller. Therefore, the sound produced at the focal point will be reduced compared to the square wave modulation.

Figure 6:
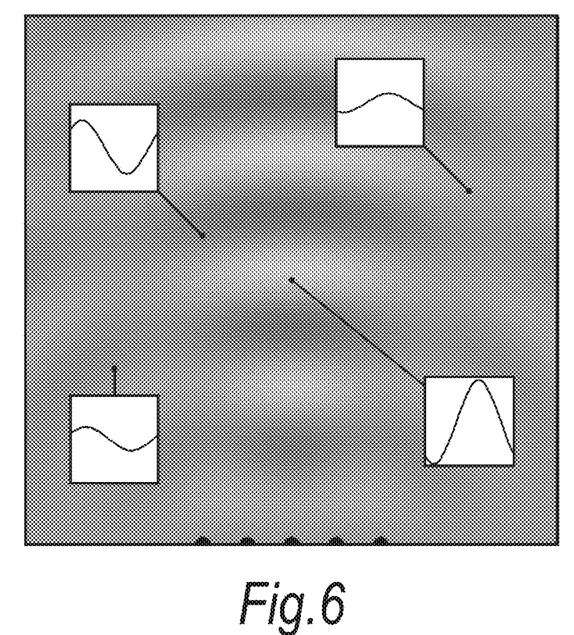
FIG. 6 shows an acoustic field generated at a focal point by a cosine interpolation modulation.
Figure 7:
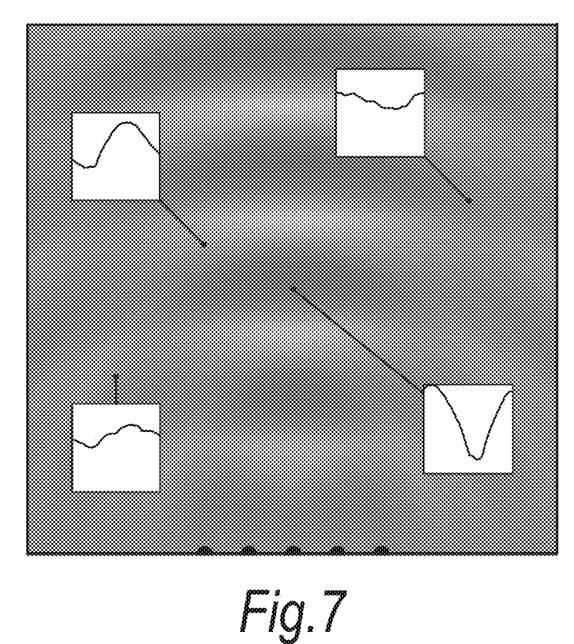
FIG. 7 shows an acoustic field generated at a focal point by a parametric speaker interpolation modulation.
Figure 8:
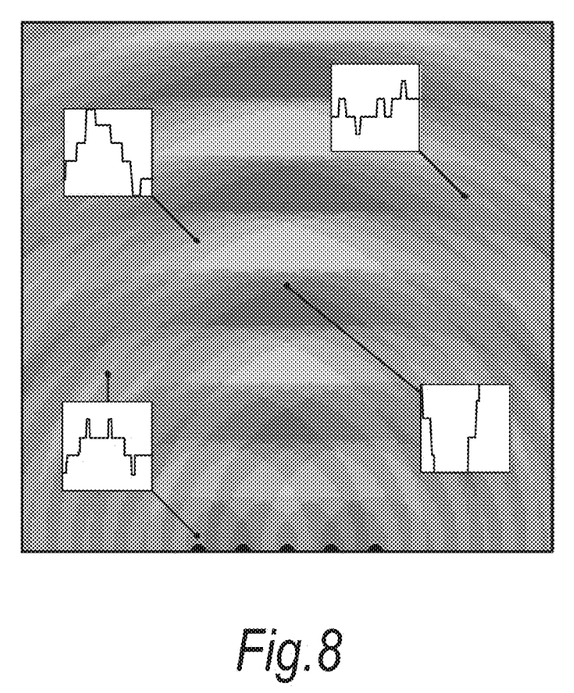
FIG. 8 shows an acoustic field generated at a focal point by a square wave modulation.

FIGS. 6, 7, and 8, show the acoustic field of audible waveforms that is produced from different modulation waveforms when a focal point is created from five point sources. The waveform at various points throughout the field are highlighted for comparison. FIG. 6 represents a cosine interpolation, FIG. 7 represents a parametric speaker interpolation, and FIG. 8 represents a square wave modulation method. As can be seen, FIG. 6 shows the smoothest, most uniform field. FIG. 7 shows a field which is not as smooth and uniform as FIG. 6, though still considerably smoother and more uniform than that shown in FIG. 8. Therefore it is evident that the cosine interpolation provides the optimum modulation compared to the others discussed. On investigation, the skilled person may discover alternative modulation waveforms which perform as well as or better than a cosine interpolation, whilst still falling within the scope of the present invention.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method comprising:
   determining the position of a focal point in three-dimensional space;
   using a plurality of transducers, generating an ultrasound acoustic field to create a higher sound pressure at the focal point, a lower sound pressure in a space surrounding the focal point, and little audible sound at the focal point.

2. The method as in claim 1, wherein generating an ultrasound acoustic field comprises calculating a phase and an amplitude for each of the plurality of transducers.

3. The method as claim 2, wherein the ultrasonic acoustic field comprises ultrasonic waves, and wherein generating an ultrasound acoustic field further comprises modulating the ultrasound waves with a waveform.

4. The method as in claim 3, wherein the waveform is produced using an interpolation modulation pattern.

5. The method as in claim 3 wherein the waveform is a cosine waveform.

6. The method as in claim 4, wherein the waveform produces a continuously changing sound pressure.

7. The method as in claim 6, wherein the first derivative of the continuously changing sound pressure is continuous.

8. The method as in claim 7, wherein the second derivative of the continuously changing sound pressure is continuous.

9. The method as in claim 1, further comprising:
   varying the location of the focal point.

10. The method as in claim 9, wherein varying the location of the focal point comprises oscillating the location of the focal point about a central focal point.

11. The method as in claim 10, wherein oscillating the location of the focal point about a central focal point occurs by adjusting phase delays of at least one the plurality of transducers.

12. The method as in claim 11, wherein the adjusting phase delays of at least one the plurality of transducers results in defocusing and refocusing ultrasonic waves at a modulation frequency.

13. A method comprising:
   creating a pressure pattern with a plurality of transducers using ultrasound by defining at least one control point within a three-dimensional space comprising:
   1) calculating an acoustic field output of a first of the plurality of transducers to create a model volume within the three-dimensional space;
   2) offsetting the first of the plurality of transducers for a position, phase, and amplitude of each of the plurality of transducers other than the first of the plurality of transducers to produce an instance of iterative transducer offset data; and
   3) determining a phase and an amplitude of a point within the model volume by combining all instances of iterative transducer offset data.

14. The method as in claim 13, wherein creating a pressure pattern with a plurality of transducers using ultrasound by defining at least one control point within a three-dimensional space further comprises:
   4) defining locations of the at least one control point within the three-dimensional space to produce the pressure pattern.

15. The method as in claim 14, wherein creating a pressure pattern with a plurality of transducers using ultrasound by defining at least one control point within a three-dimensional space further comprises:
   5) specifying a desired modulation frequency for those at least one control points that represent points of maximum pressure within the pressure pattern.

16. The method as in claim 14, wherein creating a pressure pattern with a plurality of transducers using ultrasound by defining at least one control point within a three-dimensional space further comprises:
   5) calculating optimal phases so that a resulting first acoustic field is as close as possible to a second acoustic field specified by the at least one control point.

17. The method as in claim 16, wherein calculating optimal phases uses a minimum norm solver.

18. The method as in claim 17, wherein calculating optimal phases occurs multiple times to determine a solution that creates a highest intensity of the pressure pattern.

19. The method as in claim 14, wherein one of the at least one control point represents a point of maximum pressure.

20. The method as in claim 14, wherein one of the at least one control point represents a point of minimum pressure.

* * * * *